US011647066B2

United States Patent
Kruger et al.

(10) Patent No.: US 11,647,066 B2
(45) Date of Patent: *May 9, 2023

(54) EMBEDDED REMOTE DESKTOP IN INTEGRATED MODULE

(71) Applicant: Intuit Inc., Mountain View, CA (US)

(72) Inventors: Ryan David Kruger, Tucson, AZ (US); Lucas R. Doran, San Diego, CA (US); Jeffrey Wilson Kester, San Diego, CA (US); Bernadette Alexandra Mora, San Diego, CA (US); Sandeep Nayak, Karnataka (IN)

(73) Assignee: Intuit Inc., Mountain View, CA (US)

(*) Notice: Subject to any disclaimer, the term of this patent is extended or adjusted under 35 U.S.C. 154(b) by 76 days.

This patent is subject to a terminal disclaimer.

(21) Appl. No.: 17/327,481

(22) Filed: May 21, 2021

(65) Prior Publication Data

US 2021/0409519 A1  Dec. 30, 2021

Related U.S. Application Data

(62) Division of application No. 16/917,665, filed on Jun. 30, 2020, now Pat. No. 11,050,854.

(51) Int. Cl.
| | |
|---|---|
| *H04L 67/01* | (2022.01) |
| *H04L 67/02* | (2022.01) |
| *G06F 9/451* | (2018.01) |
| *H04L 67/1008* | (2022.01) |
| *H04L 67/1029* | (2022.01) |

(52) U.S. Cl.
CPC .............. *H04L 67/01* (2022.05); *G06F 9/452* (2018.02); *H04L 67/02* (2013.01); *H04L 67/1008* (2013.01); *H04L 67/1029* (2013.01)

(58) Field of Classification Search
CPC combination set(s) only.
See application file for complete search history.

(56) References Cited

U.S. PATENT DOCUMENTS

| | | | |
|---|---|---|---|
| 9,336,268 B1 | 5/2016 | Moudy et al. | |
| 2013/0321388 A1* | 12/2013 | Locke | G06F 16/9535 345/418 |
| 2015/0245079 A1 | 8/2015 | Tremblay | |
| 2015/0271541 A1 | 9/2015 | Gonder et al. | |
| 2018/0048750 A1 | 2/2018 | Hardi | |
| 2018/0152736 A1 | 5/2018 | Alexander | |
| 2019/0325765 A1 | 10/2019 | Wakefield | |
| 2019/0361694 A1* | 11/2019 | Gordon | G06F 1/3231 |

* cited by examiner

*Primary Examiner* — El Hadji M Sall
(74) *Attorney, Agent, or Firm* — Ferguson Braswell Fraser Kubasta PC

(57) ABSTRACT

A method implements an embedded remote desktop in integrated module. An integrated application is received, by a client device, from an integrated server. The integrated application includes an access link to a remote server and integrated application content that references live information from a live application. The live application is executing concurrently with the integrated application and is configured to produce the live information responsive to the integrated application content. A connection is established to the remote application. The remote application establishes a connection to the live application. The live information is received at the client device. A user input is received responsive to the live information. The user input is transmitted to the integrated server.

20 Claims, 10 Drawing Sheets

EMBEDDED REMOTE DESKTOP IN INTEGRATED MODULE

CROSS-REFERENCE TO RELATED APPLICATIONS

This application is a divisional application of and, thereby, claims benefit under 35 U.S.C. § 121 to U.S. patent application Ser. No. 16/917,665, filed Jun. 30, 2020, which is hereby incorporated by reference.

BACKGROUND

Learning management systems train users to use online tools (e.g., websites) using modules from the learning management system. A challenge with learning management systems is that updating live content of the online tools may result in having to continuously update the modules of the learning management system as well.

SUMMARY

In general, in one or more aspects, the disclosure relates to a method implementing an embedded remote desktop in integrated module. An integrated application is received, by a client device, from an integrated server. The integrated application includes an access link to a remote server and integrated application content that references live information from a live application. The live application is executing concurrently with the integrated application and is configured to produce the live information responsive to the integrated application content. A connection is established to the remote application. The remote application establishes a connection to the live application. The live information is received at the client device. A user input is received responsive to the live information. The user input is transmitted to the integrated server.

In general, in one or more aspects, the disclosure relates to a system including a client device that executes a client application. An integrated application is received, by the client device, from an integrated server. The integrated application includes an access link to a remote server and integrated application content that references live information from a live application. The live application is executing concurrently with the integrated application and is configured to produce the live information responsive to the integrated application content. A connection to the remote application is established. The remote application establishes a connection to the live application. The live information is received at the client device. A user input responsive to the live information is received. The user input is transmitted to the integrated server.

In general, in one or more aspects, the disclosure relates to a method implementing an embedded remote desktop in integrated module. An integrated application is received, by a client device, from an integrated server. The integrated application includes an access link to a remote server and integrated application content that references live information from a live application. The live application is executing concurrently with the integrated application and is configured to produce the live information responsive to the integrated application content. The integrated application content includes a question. A connection to the remote application is established. The remote application establishes a connection to the live application. The live information is received at the client device. The live information includes an answer to the question from the integrated application content. A user input responsive to the live information is received. The user input is transmitted to the integrated server.

Other aspects of the invention will be apparent from the following description and the appended claims.

DETAILED DESCRIPTION

Figure 1A:
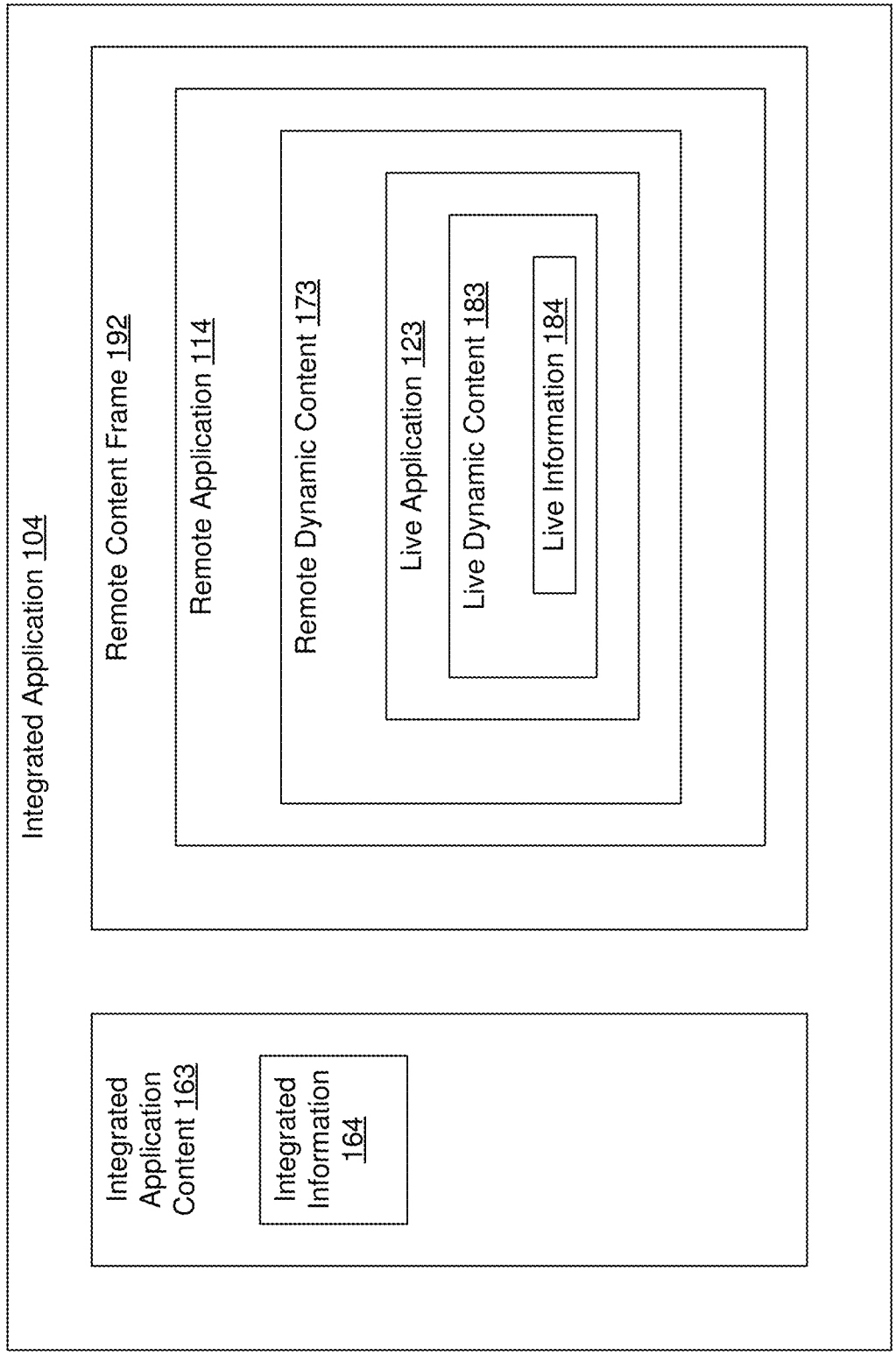
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure improve learning management systems by integrating training information with live information from the system for which users are being trained. A user logs into the system, opens a browser to view an integrated application that displays the training information (also referred to as integrated information) with live information generated by a live application. The live information is generated by the live application, transmitted to a remote server, rendered with a remote desktop executing under the remote server, and then transmitted or streamed to the client device of the user. Using the remote server to generate up-to-date live information allows the client device to display the integrated information (which may include directions and questions to guide the user) with the up-to-date live information from the lice application so that the user may be trained on the latest version of the live application without having to update the integrated application each time the live application is updated (which may change the live information generated by the live application). Additionally, using the remote server between the client device and the live application increases the security of the system by insulating the live server hosting the live application from the client device and by insulating the client device from the live server.

Figure 1B:
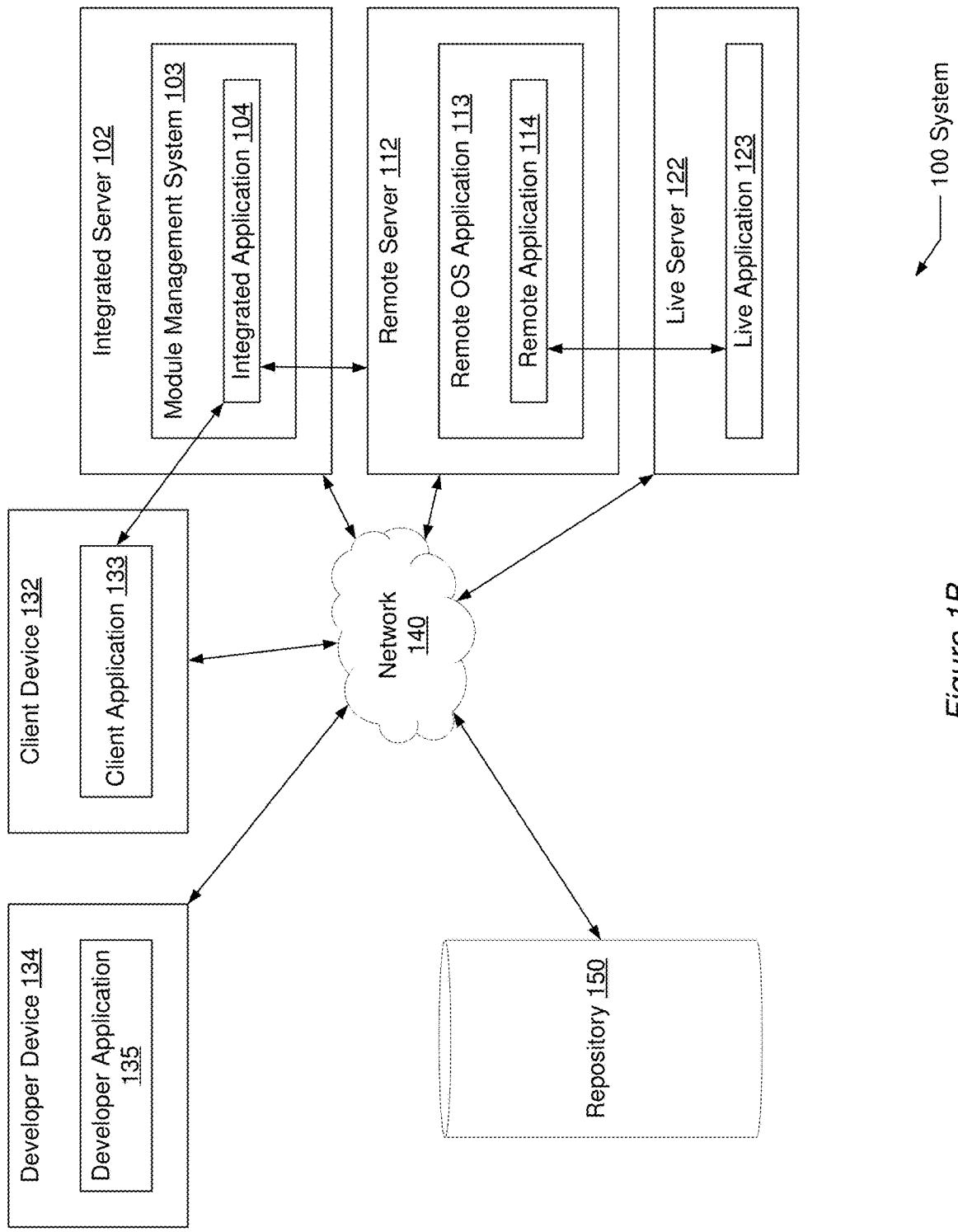
Figure 1C:
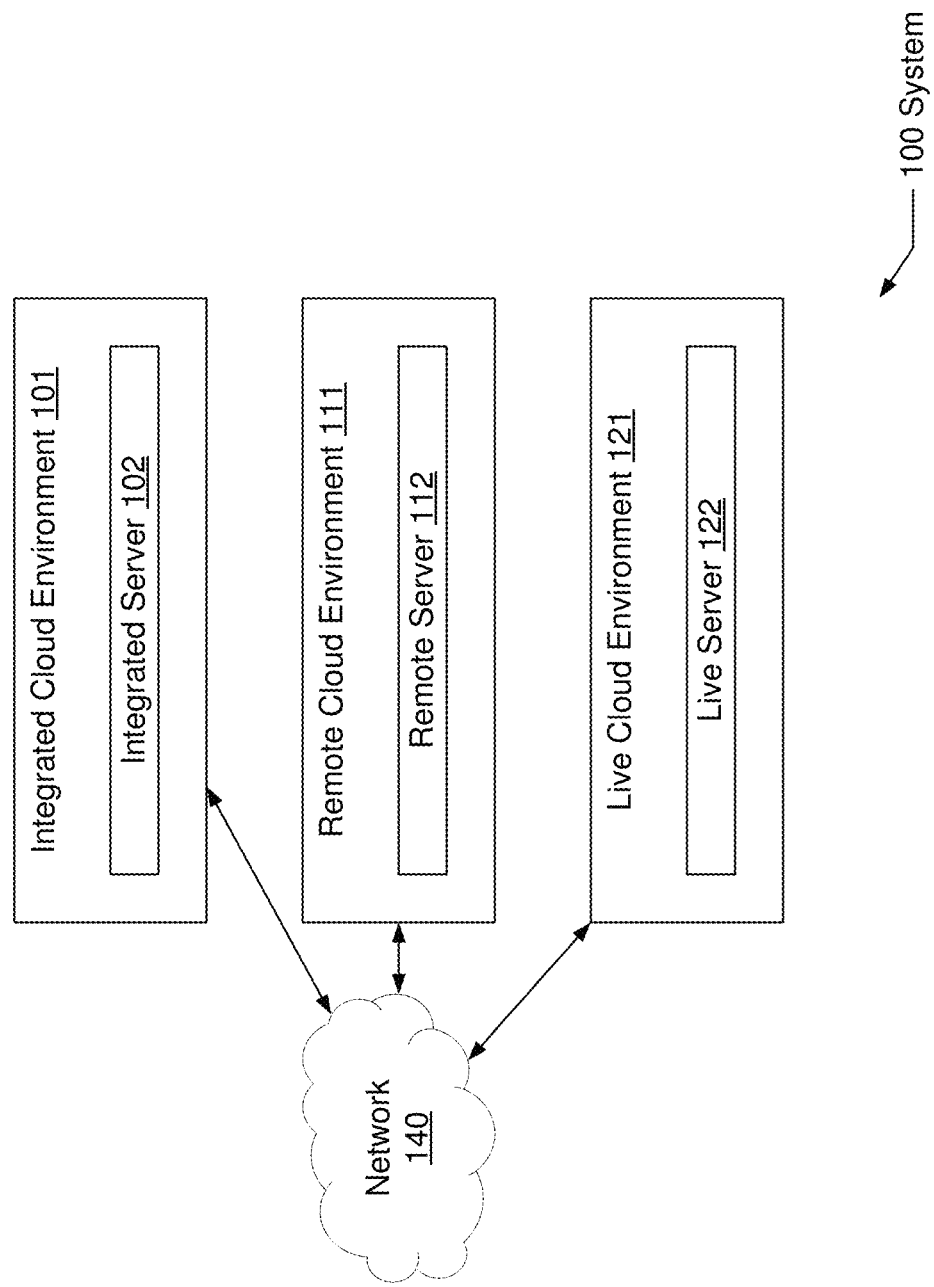
Figure 1D:
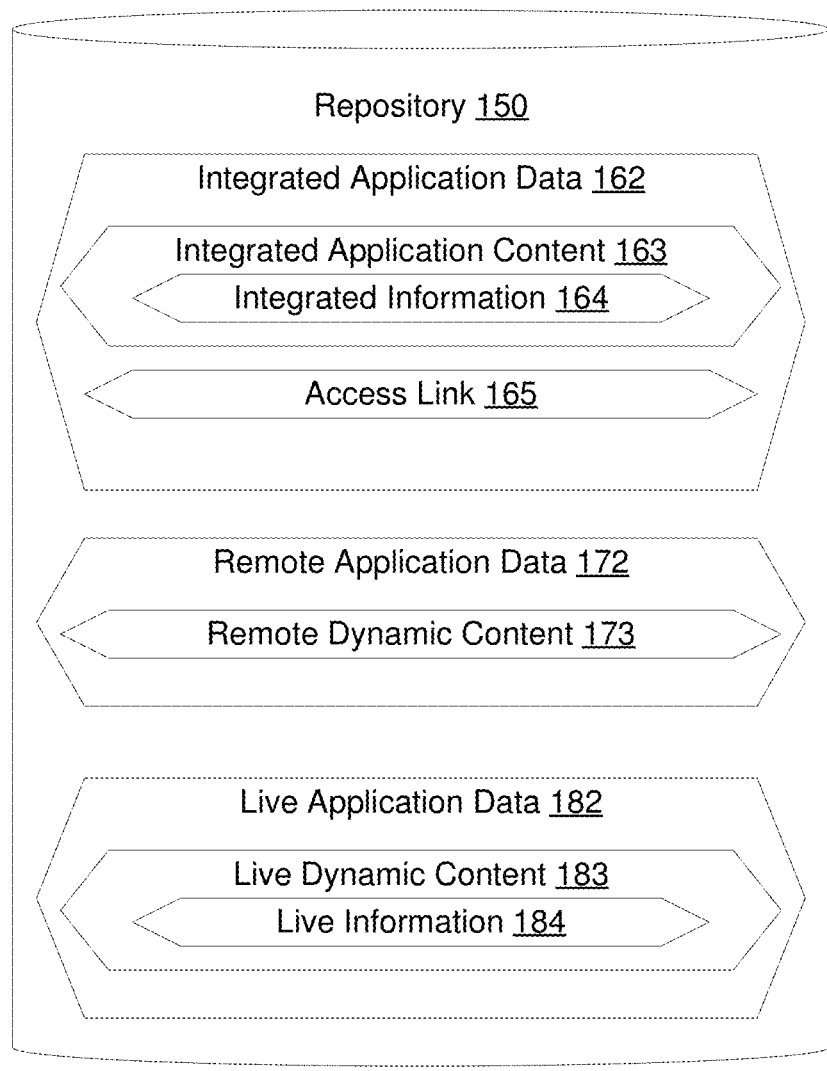

FIGS. 1A, 1B, 1C, and 1D show diagrams of embodiments that are in accordance with the disclosure. FIG. 1A shows the integrated application (104) that displays integrated application content (164) with the live dynamic content (183). FIG. 1B shows the system (100), which utilizes an embedded remote desktop in an integrated module. FIG. 1C shows a diagram of the system (100). FIG. 1D shows the repository (150). The embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to the technology of learning management systems. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the integrated application (104) displays the integrated information (164) with the live information (184). The integrated information (164) is part of the integrated application content (163). The live information (184) is part of the live dynamic content (183) that is served by the live application (123), which is accessed by the remote application (114), which is embedded into the integrated application (104) with the remote content frame (192).

The integrated information (164) may include directions and questions for a user to follow. The live information (184) may contain answers to the questions from the integrated information (104). The integrated application (104) may form part of an integrated module that uses an embedded remote desktop to train users of the live application (123). The integrated information (164) may include directions for accessing a website (e.g., the live application 123) using a browser (e.g., the remote application 114) executing on a remote desktop (e.g., the remote operating system application (113) of FIG. 1B). Following the directions and answering the questions with the answers trains the users of the system to use the website.

The remote content frame (192) may include the access link (165) of FIG. 1D to incorporate access information within the integrated application (104). The access information is used to access the remote application (114) and the live application (123). As an example, the remote content frame (192) may be an "iframe" tag in accordance with the HTML standard.

Access to the remote application may be through a remote link that may be coded into the remote content frame (192). For example, the remote link may be a uniform resource locator (URL) that, when initially accessed, triggers the instantiation of the remote server (112) (of FIG. 1B) and a virtual machine instance running under the remote server (112). The virtual machine instance executes the remote operating system application (113) (of FIG. 1B), which executes the remote application (114). The remote link may be incorporated within the remote content frame (192). For example, an iframe tag of the remote content frame (192) may include the remote link or a coded version of the remote link.

Access to the live application may be through a live link that may be a uniform resource locator that identifies the live application (123). The live link may be incorporated within the remote content frame (192) as a uniform resource locator. When the live link is not encoded into the remote content frame, the live link may be stored in the remote operating system application (113) (of FIG. 1B) or the remote application (114) and be automatically accessed upon instantiation of remote operating system application (113).

The integrated application (104) may be a web application made from multiple files using multiple standards, including the standards for hypertext markup language (HTML), extensible markup language (XML), cascading style sheets (CSS), etc. The integrated application content (163) includes HTML code of the integrated application (104) and the integrated information (164) are the strings within the application content (163) that include the directions and questions.

The live application (123) may also be a web application. The live dynamic content (183) may be generated dynamically in response to access requests. The live dynamic content (183) may include the HTML code of the live application (123) and the live information (184) are the strings within the live dynamic content (183) that include the answers to the questions from the integrated information (164).

The remote application (114) may be a web browser that accesses the live application (123) after being instantiated. A user of the integrated application (104) may interact with the remote application (114). For example, user interface events (keyboard events, mouse events, touch events, etc.) from the client device (132) may be transmitted through the network (140) to the remote application (114) to manipulate the user interface provided under the remote operating system application (112) to access the remote application (114) and the live application (123).

The remote dynamic content (173) includes data and information generated by the remote application (114) that is transmitted to and displayed through the integrated application (104) on the client device (132) of FIG. 1B. The remote dynamic content (173) includes the live dynamic content (183) and may include additional data and information from other applications running under the remote operating system application (113) (of FIG. 1B).

Turning to FIG. 1B the system (100) includes multiple servers and devices to provide content and information using an embedded remote desktop in an integrated module. The system (100) includes the integrated server (102), the remote server (112), the live server (122), the client device (132), the developer device (134) and the repository (150) (further described with FIG. 1D) that are interconnected with the network (140).

Figure 4A:
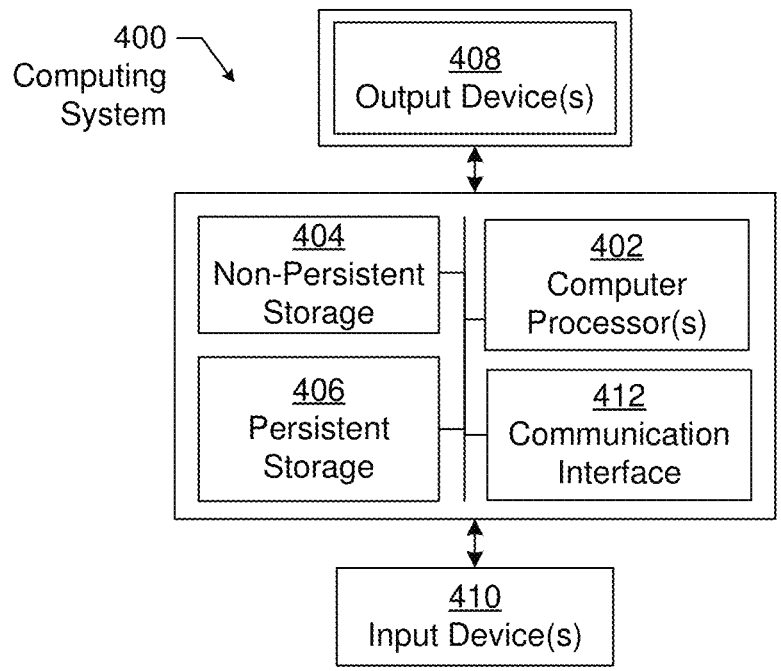
FIG. 4A and FIG. 4B show computing systems in accordance with disclosed embodiments.
Figure 4B:
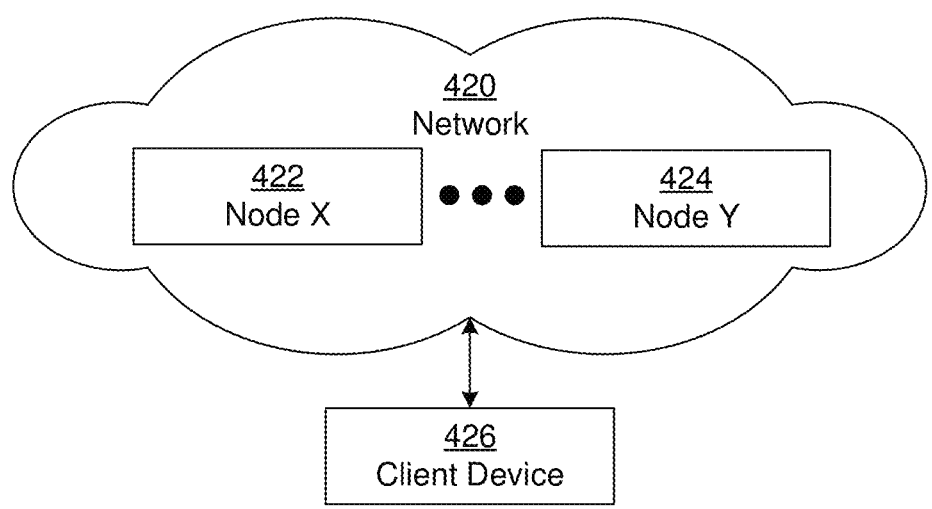

The integrated server (102) is an embodiment of the computing systems of FIGS. 4A and 4B. The integrated server (102) may be one of a set of virtual machines hosted by a cloud services provider to deploy the module management system (103) with the integrated application (104) for an application services provider. The integrated server (102) transmits the integrated application (104) to the client device (132) and interacts with the client device (132) and the developer device (134).

The module management system (103) is a set of one or more programs executing on the integrated server (102) that interacts with the client application (103) of the client device (132) and with the developer application (135) of the developer device (134). The module management system (103) provides content to users of the system. As an example, the module management system (103) may be a training management system with training modules that teach a user of the system to use the live application (123). The module management system (103) includes the integrated application (104).

The integrated application (104) is a set of programs and data that provide content to a user of the system. As an example, the integrated application (104) may be a web application including multiple files accessed using standard protocols, including, transmission control protocol (TCP), internet protocol (IP), hypertext transfer protocol, etc.

The remote server (112) is an embodiment of the computing systems of FIGS. 4A and 4B. The remote server (112) may be one of a set of virtual machines hosted by a cloud services provider that hosts a virtual machine instance that runs the remote operating system application (113). The remote server (112) and the virtual machine instance for the remote operating system application (113) may individually be provisioned and instantiated on demand in response to requests from the client device (132). The remote server interacts with the client device (132) and the live server (122).

The remote operating system application (113) is a set of programs and data operating on a virtual machine instance of the remote server (112). As an example, the remote operating system application (113) may be a remote desktop operating system environment that includes a desktop operating system that is the same as the desktop operating system on the client device (132) that runs the client application (133).

The remote application (114) is a set of data and programs running under the remote operating system application (113). The remote application (114) accesses the live application (123) and renders the live dynamic content (183) received from the live server (122). As an example, the remote application (114) may be a browser that interacts with and displays websites, including the live application (123).

The live server (122) is an embodiment of the computing systems of FIGS. 4A and 4B. The live server (122) may be one of a set of virtual machines hosted by a cloud services provider to deploy the live application (123) for an application services provider. The live server (122) interacts with the remote server (112) to serve the live application (123) to the remote application (114).

The live application (123) is a set of programs and data that provide content to a user of the system. As an example, the live application (123) may be a web application providing online tax and accounting services including multiple files accessed using standard protocols, including, transmission control protocol (TCP), internet protocol (IP), hypertext transfer protocol, etc.

The client device (132) is an embodiment of the computing systems of FIGS. 4A and 4B. The client device (132) may be used by a user of the system that is learning to use the live application (123). The client device (132) includes the client application (133), which may include multiple interfaces (a graphical user interface, application programming interfaces, etc.) for interacting with the integrated application and the remote application (114). The client application (133) displays the integrated information (164) with an up-to-date version of the live information (184) without having to modify the integrated application (104) to account for the changes to the remote application (114) and the live application (123).

The developer device (134) is an embodiment of the computing systems of FIGS. 4A and 4B. The developer device (134) includes the developer application (135) for controlling and maintaining the module management system (103) and the integrated application (104). The developer application (135) may include a graphical user interface for interacting with an integrated development environment to maintain and control the module management system (103) and the integrated application (104).

The developer application (135) and the client application (133) may be web browsers that access the module management system (103) and the integrated application (104) using web pages hosted by the integrated server (102). The developer application (135) and the client application (133) may additionally be web services that communicate with the module management system (103) and the integrated application (104) using representational state transfer application programming interfaces (RESTful APIs). Although FIG. 1C shows a client server architecture, one or more parts of the multiple applications may be local applications on the developer device (134) and the client device (132) without departing from the scope of the disclosure.

The network (140) is a system of interconnected computer networks and equipment connecting components of the system (100). The network (140) may use standard protocols to transmit and receive information with the devices connected to the network (140). For example, the network (140) may operate according to the transmission control protocol/internet protocol (TCP/IP) standard.

Turning to FIG. 1C, the system (100) may be implemented using multiple cloud environments. The integrated server (102) may be instantiated within the integrated cloud environment (101). The remote server (112) may be instantiated within the remote cloud environment (111). The live server (122) may be instantiated within the live cloud environment (121). The cloud environment (101), the cloud remote cloud environment (111), and the live cloud environment (121) may be different cloud environments operated by different cloud service providers. In additional embodiments, the cloud environment (101), the cloud remote cloud environment (111), and the live cloud environment (121) may be separate provisions of a single cloud environment of a single cloud services provider.

Turning to FIG. 1D, the repository (150) is a computing system that may include multiple computing devices in accordance with the computing systems of FIGS. 4A and 4B. The repository (150) may be hosted by a cloud services provider for the application services provider operating the module management system (103) and the integrated application (104). The cloud services provider may provide hosting, virtualization, and data storage services as well as other cloud services and the application services provider may operate and control the data, programs, and applications that store and retrieve data from the repository. The data in the repository (150) may include the integrated application data (162), the remote application (172), and the live application data (182).

The integrated application data (162) includes the integrated application content (163), the integrated information (164), and the access link (165), as described in FIG. 1A. The remote application data (172) includes the remote dynamic content (173), as described in FIG. 1A. The live application data (182) includes the live dynamic content (183) and the live information (184), as described in FIG. 1A.

Figure 2A:
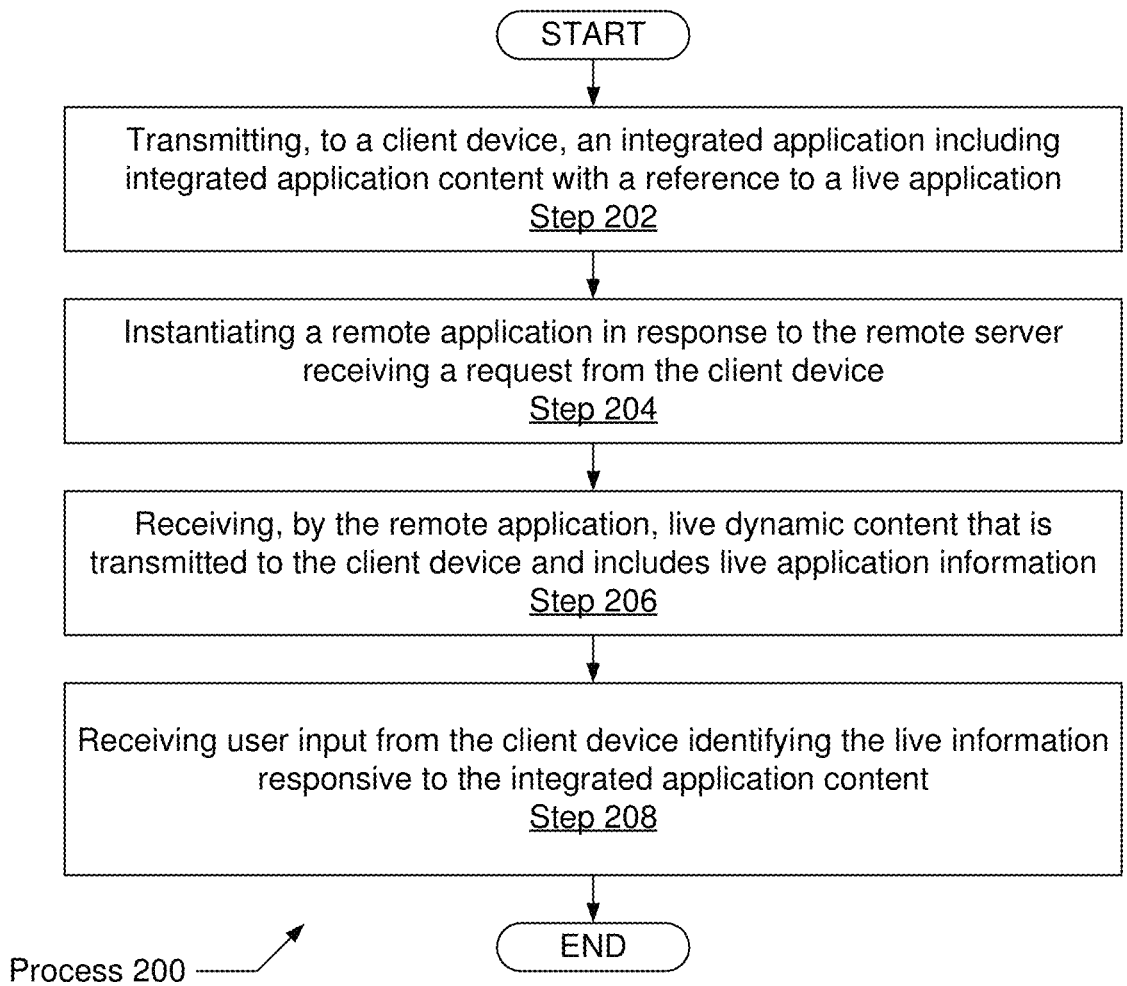
FIG. 2A and FIG. 2B show flowcharts in accordance with disclosed embodiments.
Figure 2B:
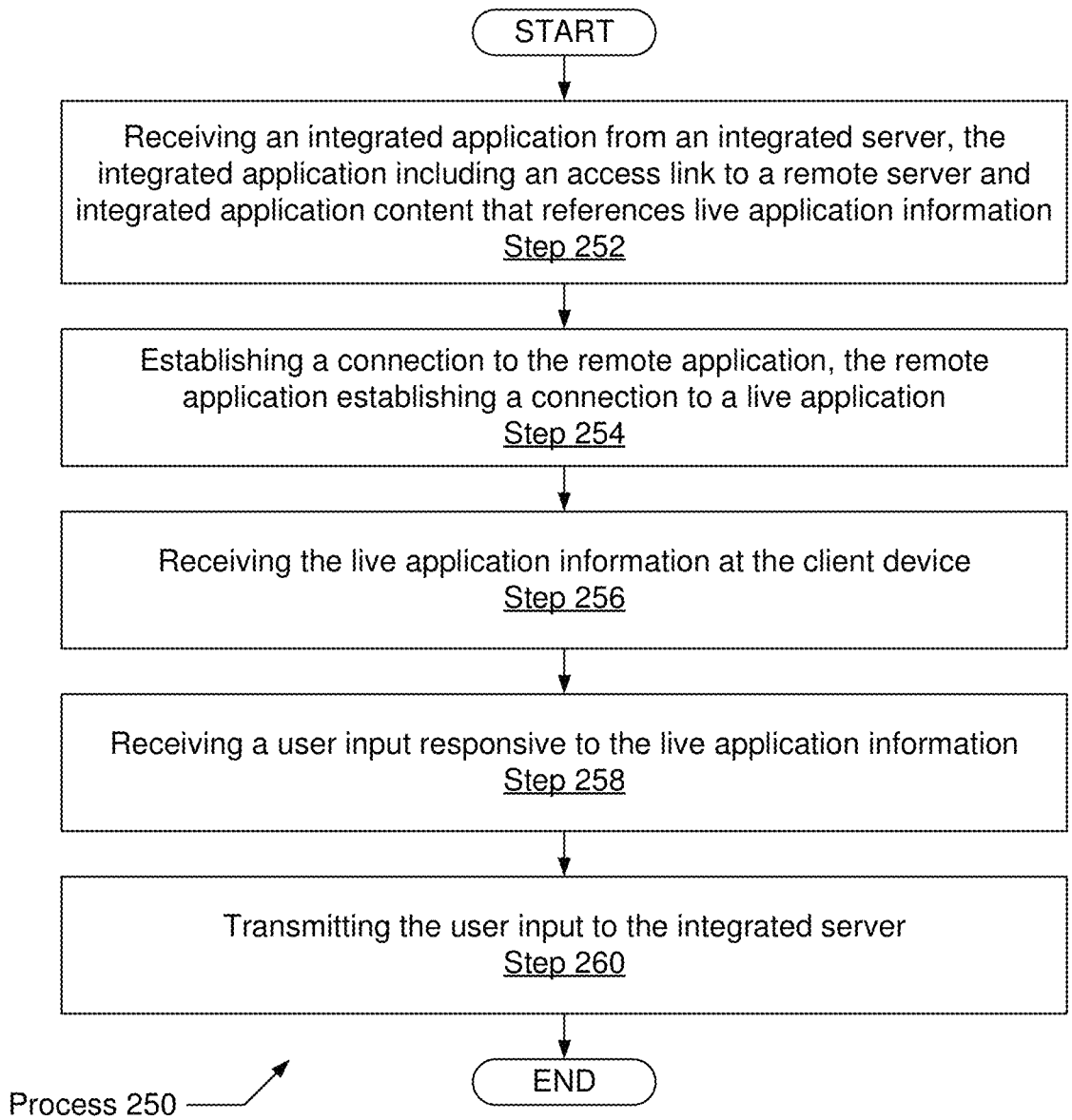

FIGS. 2A and 2B show flowcharts of the process (200) and the process (250) in accordance with the disclosure. The process (200) of FIG. 2A transmits an integrated application and live information to a client device. The process (250) of FIG. 2B receives the integrated application and live information at the client device. The embodiments of FIGS. 2A and 2B may be combined and may include or be included within the features and embodiments described in the other figures of the application. The features of FIGS. 2A and 2B are, individually and as an ordered combination, improvements to the technology of computing systems and learning management systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) may execute on one or more servers in a cloud environment. At Step 202, an integrated application including integrated application content with a reference to a live application is transmitted to a client device. The integrated application may be transmitted in response to a request from a client device to the integrated server hosting the integrated application. In one embodiment, the integrated application content includes integrated information with a question that can be answered with live information from a live application. The integrated application also includes an access link to a remote server. The live application executes concurrently with the integrated application and is configured to produce the live information responsive to and answers the question from the integrated application content.

The integrated application may include one or more hypertext markup language (HTML) files that may be transferred to the client device and displayed with a client application (e.g., a browser). The access link to the remote server may be presented within an iframe tag within the integrated application. The integrated application may form part of a module of a learning management system that administrates, documents, tracks, reports, automates, and delivers educational courses, training programs, and learning and development programs. The integrated application may be generated with a content generation system, which generates the content (the courses and programs) for the learning management system.

In one embodiment, the live application is running on a live server that is different from an integrated server running the integrated application. The live server may be hosted by a live cloud environment that is different from an integrated cloud environment hosting the integrated server.

At Step 204, a remote application is instantiated in response to the remote server receiving a request from the client device using the access link. The access link includes a uniform resource locator that identifies a remote server. In one embodiment, the remote server is instantiated after the request is received by the system. After being instantiated the remote operating system and the remote application begin to execute on the remote server. A script may be used to control the remote operating system and the remote application after the remote server is instantiated. The script may trigger the remote application to request the live application from the live server by accessing another uniform resource locator that routes to the live server hosting the live application.

In one embodiment, the remote application is instantiated on a remote server that is different from an integrated server hosting the integrated application. The remote server may be in a remote cloud environment that is different from an integrated cloud environment hosting the integrated server running the integrated application.

In one embodiment, the remote server is instantiated in response to the request using the access link. The remote server includes a virtual machine instance executing a remote operating system application running the remote application. The remote server may be different from a live server running the live application and the remote server may be hosted by a remote cloud environment that is different from a live cloud environment hosting the live application server.

In one embodiment, user credentials may be received by the integrated application. The user credentials may be used to log into the integrated application and to log into the live application. The user credentials may include a username, password, email address, sign in key, etc.

In one embodiment, the access link is generated as a dynamic link by the integrated application. The access link may be generated dynamically for the remote server and then removed after the user logs out of the system. The dynamic link may include the host name for the remote server followed by the path name and attributes with the path name or attributes being dynamically generated for the user. As an example, the path name may include the username. As another example, the attributes may include a hash of the user credentials.

At Step 206, live dynamic content is received at the client device. The live dynamic content includes the live information, which may include an answer to a question from the integrated information. The live application is updated after the generation of the integrated application and is displayed by the client device with the integrated application content.

At Step 208, user input is received from the client device identifying the live information responsive to the integrated application content. In one embodiment, the live information includes an answer to the question from the integrated application content. Answering questions from the integrated information with answers from the live information trains a user to use the live application.

Turning to FIG. 2B, the process (250) may execute on a client device. At Step 252, an integrated application is received by a client device from an integrated server. The integrated application includes an access link to a remote server and includes integrated application content that references live information. The live application may execute concurrently with the integrated application. The live application is configured to produce live information responsive to the integrated application content.

At Step 254, a connection is established to the remote application. The remote application may then establish a connection to a live application. The connection to the live application may be established in response to interaction between the client device and the remote server.

At Step 256, the live information from the live application is received at the client device. The live information may be displayed at the client device with integrated information from the integrated application. For example, the integrated information may include a question for which the answer is present in the live information with both the question and the answer (from the live information) being displayed on the client device.

At Step 258, a user input responsive to the live information is received. The user input is received by the client application running on the client device.

At Step 260, the user input is transmitted to the integrated server. The user input transmitted to the integrated server may be responsive to the question presented in the integrated information. The module management system operating the integrated application may record the answer, determine if the answer is correct, and track the progress of the user using the system.

Figure 3A:
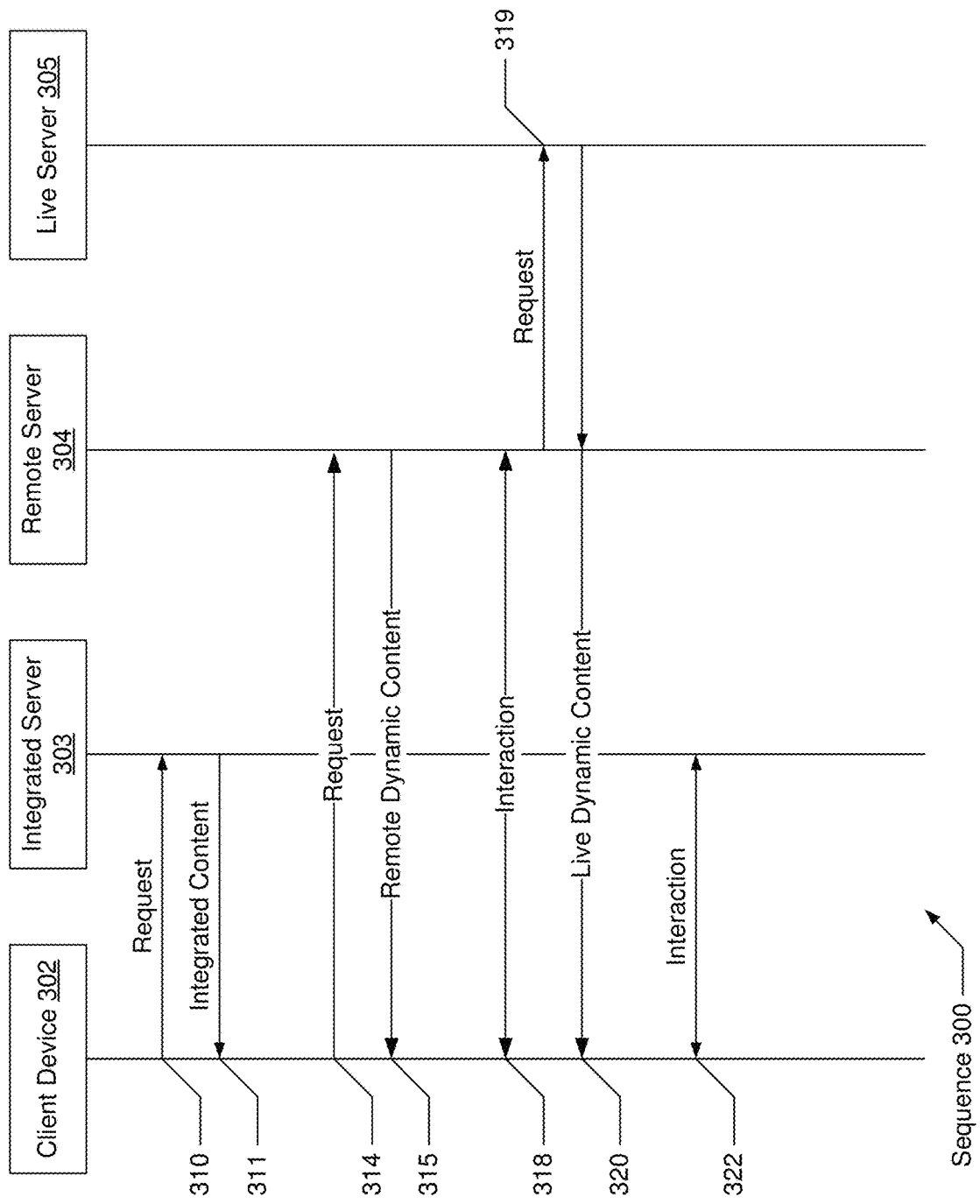
FIG. 3A, FIG. 3B, and FIG. 3C show examples in accordance with disclosed embodiments.
Figure 3B:
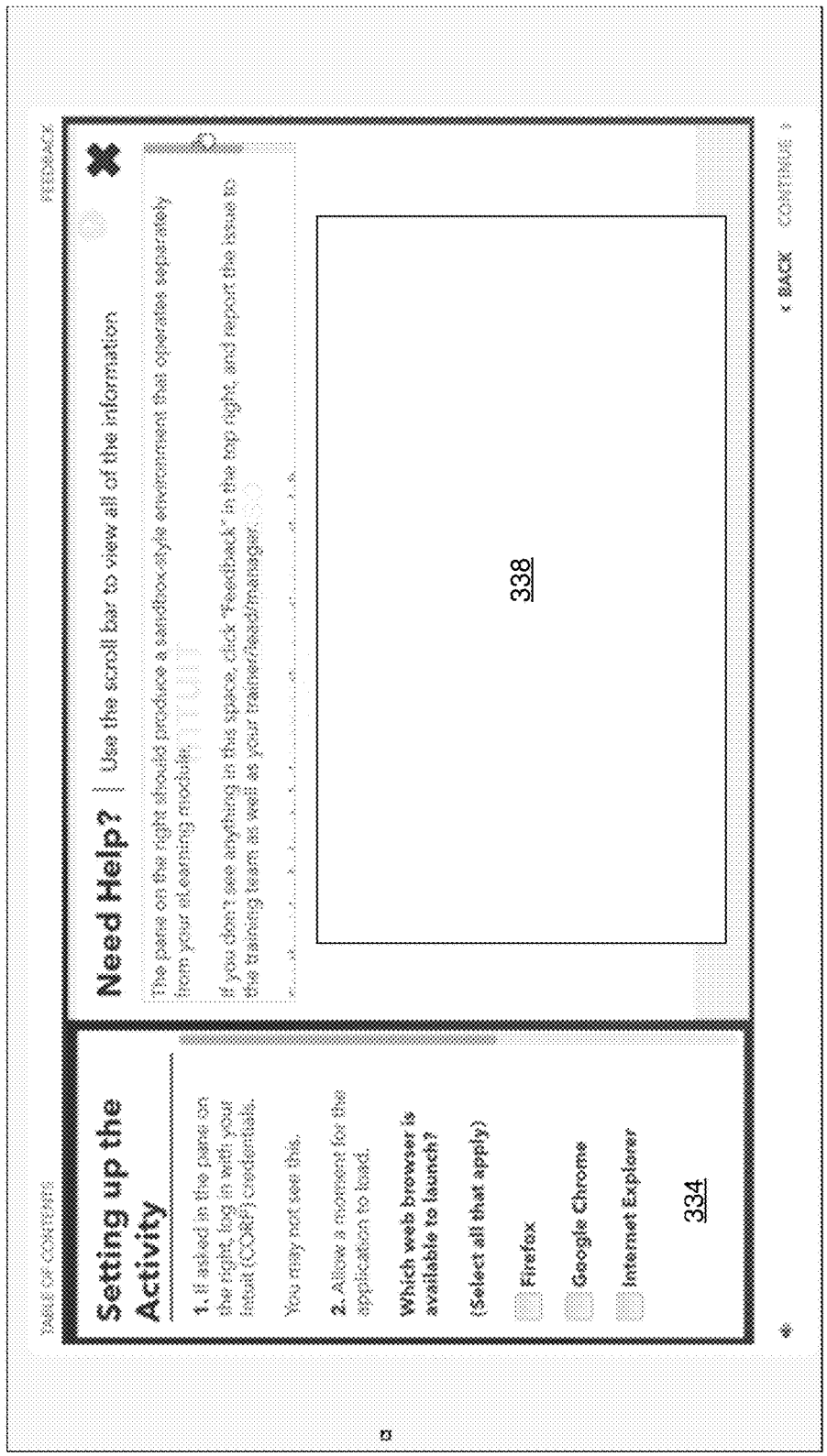
Figure 3C:
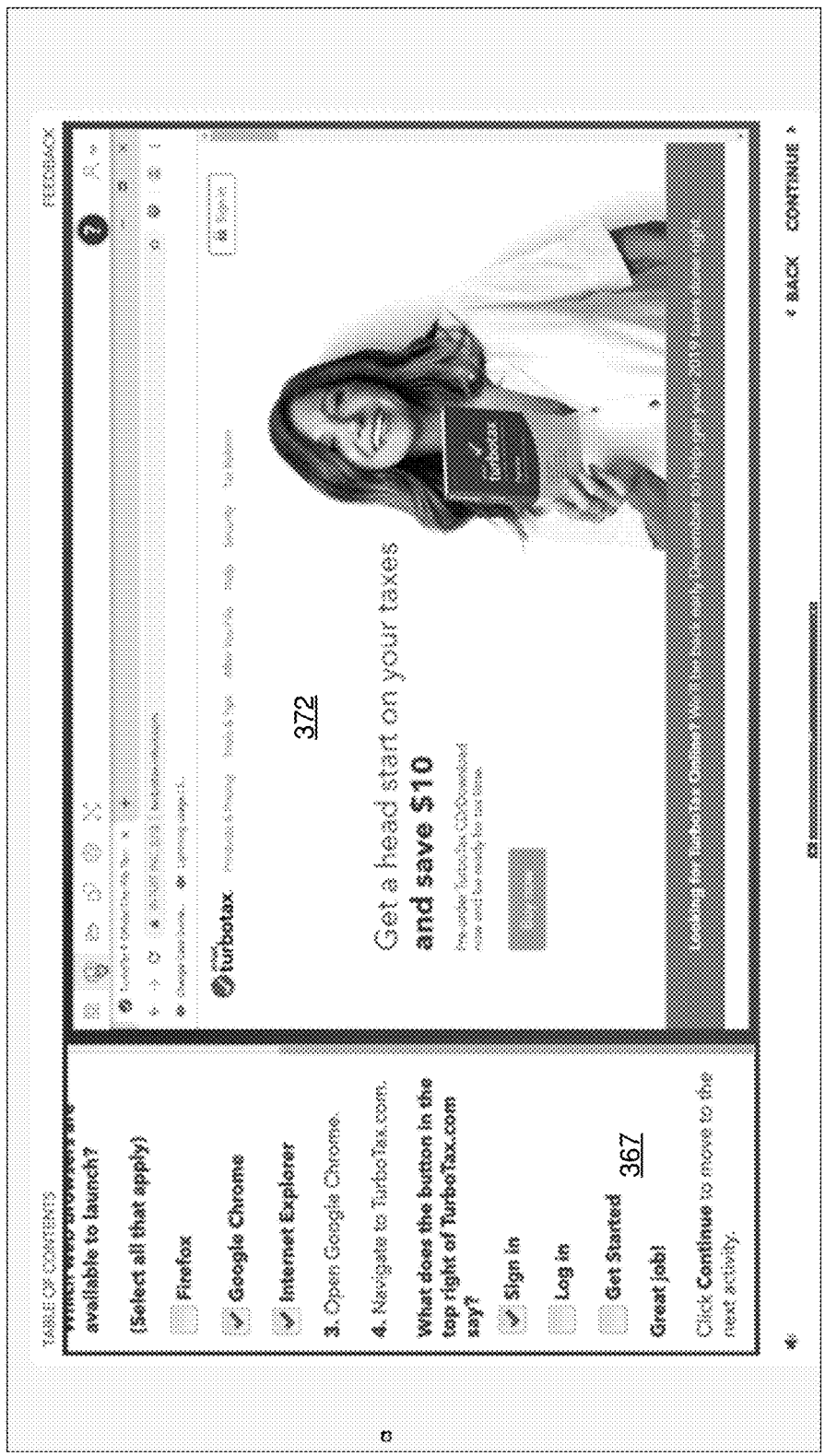

FIGS. 3A, 3B, and 3C show examples of systems and interfaces in accordance with the disclosure. FIG. 3A shows a sequence for transmitting and displaying integrated information with live information. FIG. 3B shows an example of integrated information being displayed with live information. FIG. 3C shows an example of the display of integrated information after interaction with the integrated content by the user. The embodiments of FIGS. 3A, 3B, and 3C may be combined and may include or be included within the features and embodiments described in the other figures of the application. The features and elements of FIGS. 3A, 3B, and 3C are, individually and as a combination, improvements to the technology of computing systems and learning management systems. The various features, elements, widgets, components, and interfaces shown in FIGS. 3A, 3B, and 3C may be omitted, repeated, combined, and/or altered as shown. Accordingly, the scope of the present disclosure should not be considered limited to the specific arrangements shown in FIGS. 3A, 3B, and 3C.

Turning to FIG. 3A, the client device (302), the integrated server (303), the remote server (304), and the live server (305) are embodiments of the computing systems of FIGS. 4A and 4B. At Step 310 of the sequence (300), the client device (302) sends a request for an integrated application and the request is received by the integrated server (303). The request is from a client application operating on the client device.

At Step 311, the integrated content is transmitted from the integrated server (303) and received by the client device (302). The integrated content is part of the integrated application hosted by the integrated server (303). The integrated content is displayed on the client device (302) and may include questions and directions.

At Step 314, a request is transmitted from the client device (302) and is received by the remote server (304). The request may be in response to an access link included in the integrated application. The access link identifies the remote server (304) and is used to access the live information from the live application hosted by the live server (305). The remote server (304) along with a remote operating system application and a remote application may be instantiated in response to the request and may be used to access the live application hosted by the live server (305).

At Step 315, remote dynamic content is transmitted from the remote server (304) and is received by the client device (302). The remote dynamic content may include the rendering and display the remote desktop environment operating on the remote server (304), which may include the rendering and display of the remote application (e.g., a browser).

At Step 318, the client device (302) and the remote server (304) interact. The interaction may include transmitting user interface events (keyboard events, mouse events, touch events, etc.) from the client device (302) to the remote operating system application running on the remote server. The user interface events from the client device (302) may control the remote operating system application. For example, the interaction may open a browser on the remote operating system application to access the live application. The remote server (304) may continuously transmit updates to the display of the remote operating system application to the client device (302).

At Step 319, a request is transmitted from the remote server and is received by the live server (305). The request accesses the live application hosted by the live server (305).

At Step 320, live dynamic content is transmitted by the live server (305), passed through the remote server (304), and received by the client device (302). The remote browser application executing under the remote operating system application on the remote server may render the live application, which may be streamed to the client device (302). Streaming the display of the live application to the client device through the remote server (304) increases the security of the system, protecting the live server (305) from malicious activity originating from the client device (302), and protects the client device (302) from malicious activity originating from the live server (305). The live dynamic content includes live information that is responsive to the integrated information from the integrate server and is displayed with the integrated information on the client device (302).

At Step 322, the client device (302) and the integrated server (303) interact. The interaction may include transmitting the answer (from the live information) to a question (from the integrated information) to the integrated server. The integrated server may track and record progress of users with using the integrated application.

Turning to FIG. 3B, the graphical user interface (333) displays the integrated content (334) with the remote dynamic content (338). The integrated information (334) includes integrated information with directions and questions for interacting with the remote application hosted by the remote server to interact with a live application hosted by the live server. That the remote application is operating under a remote server may not be shown to the user. The view of the remote dynamic content (338) is blank while the remote server and the remote operating system application are being instantiated.

Turning to FIG. 3C, the interface (366) is updated from the interface (333) of FIG. 3B. The integrated content (367) is updated with different integrated information and to show interaction by the user with the integrated content (367). The remote dynamic content (372) is updated to display the remote application (a browser with one tab) and to display live information (a webpage) from the live application (a website). The live information is included in live dynamic content that is within the remote dynamic content (372).

The integrated information in the integrated content (367) includes the question asking about the top right button from the website. As seen in the live information (within the remote dynamic content (372)), the top right button is a sign in button. The integrated content (367) includes a check box that has been checked by the user to indicate that the top right button of the website is a sign in button. From this interaction, the user may learn to sign into the live application.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIG. 4A and FIG. 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hypertext Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail, such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, by a client device, an integrated application from an integrated server, the integrated application comprising an access link to a remote server and integrated application content that references live information from a live application, wherein the live application is executing concurrently with the integrated application and is configured to produce the live information responsive to the integrated application content;
establishing a connection to the remote application, the remote application establishing a connection to the live application;
receiving the live information at the client device;
receiving a user input responsive to the live information; and
transmitting the user input to the integrated server.

2. The method of claim 1, further comprising:
receiving the integrated application, wherein the integrated application content comprises a question; and
receiving the live information at the client device, wherein the live information comprises an answer to the question from the integrated application content.

3. The method of claim 1,
wherein the integrated application comprises one or more hypertext markup language (HTML) files,
wherein the access link to the remote server is presented within an iframe tag within the integrated application,
wherein the integrated application forms part of a module of a learning management system, and
wherein the integrated application is generated with a content generation system.

4. The method of claim 1, further comprising:
establishing the connection to the remote application, wherein the remote server is different from the integrated server hosting the integrated application, the remote server in a remote cloud environment that is different from an integrated cloud environment hosting the integrated server running the integrated application.

5. The method of claim 1, further comprising:
receiving the integrated application referencing the live application, wherein the live application is running on a live server that is different from the integrated server running the integrated application, wherein the live server is hosted by a live cloud environment that is different from an integrated cloud environment hosting the integrated server.

6. The method of claim 1, further comprising:
establishing the connection to the remote application, wherein the remote server is instantiated in response to a request using the access link, the remote server comprising a virtual machine instance executing a remote operating system application running the remote application, wherein the remote server is different from a live server running the live application and the remote server is hosted by a remote cloud environment that is different from a live cloud environment hosting the live application server.

7. The method of claim 1, further comprising:
transmitting, by the client device, user credentials used to log into the integrated application and to log into the live application.

8. The method of claim 1, further comprising:
establishing the connection to the remote application, wherein the remote application is instantiated on a remote server that is different from the integrated server hosting the integrated application, the remote server in a remote cloud environment that is different from an integrated cloud environment hosting the integrated server running the integrated application.

9. The method of claim 1, further comprising:
receiving the integrated application, wherein the access link is generated, by the integrated application, as a dynamic link for the remote server.

10. A system comprising:
a client device;
the client device executing a client application configured for:
receiving, by the client device, an integrated application from an integrated server, the integrated application comprising an access link to a remote server and integrated application content that references live information from a live application, wherein the live application is executing concurrently with the integrated application and is configured to produce the live information responsive to the integrated application content;

establishing a connection to the remote application, the remote application establishing a connection to the live application;

receiving the live information at the client device;

receiving a user input responsive to the live information; and transmitting the user input to the integrated server.

11. The system of claim 10, wherein the integrated application content comprises a question; and wherein the live information comprises an answer to the question from the integrated application content.

12. The system of claim 10, wherein the integrated application comprises one or more hypertext markup language (HTML) files, wherein the access link to the remote server is presented within an iframe tag within the integrated application, wherein the integrated application forms part of a module of a learning management system, and wherein the integrated application is generated with a content generation system.

13. The system of claim 10, wherein the client application is further configured for:

establishing the connection to the remote application, wherein the remote server is different from the integrated server hosting the integrated application, the remote server in a remote cloud environment that is different from an integrated cloud environment hosting the integrated server running the integrated application.

14. The system of claim 10, wherein the client application is further configured for:

receiving the integrated application referencing the live application, wherein the live application is running on a live server that is different from the integrated server running the integrated application, wherein the live server is hosted by a live cloud environment that is different from an integrated cloud environment hosting the integrated server.

15. The system of claim 10, wherein the client application is further configured for:

establishing the connection to the remote application, wherein the remote server is instantiated in response to a request using the access link, the remote server comprising a virtual machine instance executing a remote operating system application running the remote application, wherein the remote server is different from a live server running the live application and the remote server is hosted by a remote cloud environment that is different from a live cloud environment hosting the live application server.

16. The system of claim 10, wherein the client application is further configured for:

transmitting, by the client device, user credentials used to log into the integrated application and to log into the live application.

17. The system of claim 10, wherein the client application is further configured for:

establishing the connection to the remote application, wherein the remote application is instantiated on a remote server that is different from the integrated server hosting the integrated application, the remote server in a remote cloud environment that is different from an integrated cloud environment hosting the integrated server running the integrated application.

18. The system of claim 10, wherein the client application is further configured for:

receiving the integrated application, wherein the access link is generated, by the integrated application, as a dynamic link for the remote server.

19. A method comprising:

receiving, by a client device, an integrated application from an integrated server, the integrated application comprising an access link to a remote server and integrated application content that references live information from a live application, wherein the live application is executing concurrently with the integrated application and is configured to produce the live information responsive to the integrated application content, and wherein the integrated application content comprises a question;

establishing a connection to the remote application, the remote application establishing a connection to the live application;

receiving the live information at the client device, wherein the live information comprises an answer to the question from the integrated application content;

receiving a user input responsive to the live information; and transmitting the user input to the integrated server.

20. The method of claim 19, wherein the integrated application comprises one or more hypertext markup language (HTML) files, wherein the access link to the remote server is presented within an iframe tag within the integrated application, wherein the integrated application forms part of a module of a learning management system, and wherein the integrated application is generated with a content generation system.

* * * * *